Nov. 26, 1940.  J. R. BREUCHAUD  2,222,651
FERMENTATION CELL FOR CONVERTING ORGANIC MATTER TO HUMUS
Filed Dec. 17, 1936
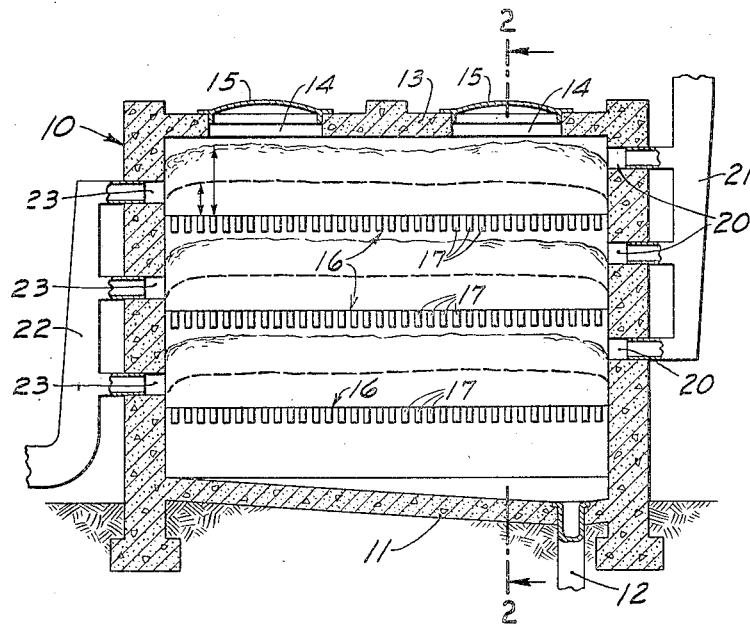
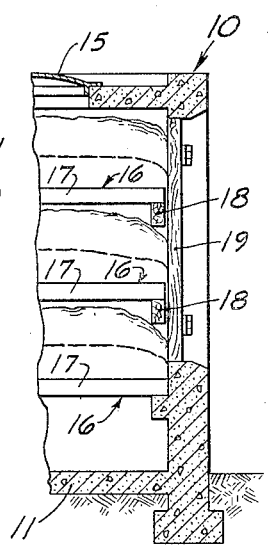
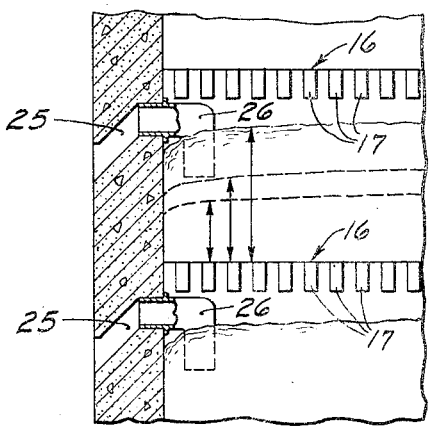
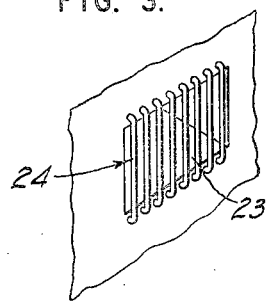
INVENTOR
JULES R. BREUCHAUD
BY
his ATTORNEY Patented Nov. 26, 1940

2,222,651

UNITED STATES PATENT OFFICE 2,222,651

FERMENTATION CELL FOR CONVERTING ORGANIC MATTER TO HUMUS

Jules R. Breuchaud, New York, N. Y., assignor, by mesne assignments, to Underpinning & Foundation Company, Inc., New York, N. Y., a corporation of New York Application December 17, 1936, Serial No. 116,412

5 Claims. (Cl. 195—142)

This invention relates to the treatment of organic material, particularly waste organic material such as garbage, sewage sludge and sewage screenings, to convert it into humus or the like which may be suitable for use as a fertilizer or as a constituent of a fertilizer, and more particularly to a method of and an apparatus for carrying out such treatment.

Heretofore, waste organic material has been subjected to anaerobic fermentation and after such fermentation has been carried out to a sufficient extent the material has been exposed to air which checks the anaerobic fermentation and dries the material and may also produce aerobic fermentation.

The principal objects of the invention are to provide novel, advantageous and effective forms of method and apparatus for carrying out such treatment.

Other objects are to provide a novel method of and a novel apparatus for treatment of organic material in which the exclusion of air to cause anaerobic fermentation is rendered substantially complete by part of the material under treatment. Further objects relate to methods of and apparatus for conversion of organic material to humus in which, after an initial period of anaerobic fermentation and drainage, the shrinkage of the material automatically admits air to check the anaerobic fermentation and both dry the material and cause aerobic fermentation.

In carrying out my invention, the garbage or like material is enclosed in a structure having one or more air inlets which are substantially closed against the admission of air by garbage completely blocking the same and extending substantially above the same so that a substantial shrinkage of material would be necessary before the inlet or inlets would be opened for the admission of air. Further shrinkage of the materials and a corresponding increase in flow of air through the inlets would result from air drying of the material as well as aerobic fermentation. Preferably the material which may be in a substantially solid mass may be supported at different levels so that due to shrinkage by drainage and anaerobic fermentation the mass may be separated into separate layers of thicknesses reduced to such an extent that air entering the enclosure or cell may have access to the material at the interior of each layer.

Further objects, features and advantages will appear upon consideration of the following description and of the drawing, in which:

Fig. 1 is a vertical section of a fermentation cell embodying one form of the present invention;

Fig. 2 is a section on the line 2—2 of Fig. 1;

Fig. 3 is a fragmentary view illustrating means for preventing the working of material under treatment into inlets or outlets; and Fig. 4 is a fragmentary sectional view illustrating a modification of the structure at the left of Fig. 1.

As illustrated in the drawing, the apparatus may comprise a fermentation cell 10, of suitable material such as concrete, having a bottom 11 inclined downwardly to a drain 12 and a top 13 provided with charging openings 14 and covers 15 therefor. At its interior the cell may be divided into compartments by vertically spaced openwork trays or racks 16 each of which may conveniently comprise a plurality of members or bars 17 sufficiently close together to prevent garbage from falling therebetween and held together as by members or bars 18 attached to the bars 17 at their ends. The trays or racks 16 may be removably supported on projections (not shown) at the inner surfaces of side walls of the cell. In one lateral wall (Fig. 2) there may be a doorway provided with one or more doors 19 which may be opened for the removal of the treated material and for the shifting of the trays during such removal of material and also during the charging of the cell.

Anaerobic fermentation of material in the cell is accompanied by the generation of considerable gas which may pass out of the cell through openings or outlets 20, at least one at the upper part of each compartment above a tray or rack 16, connected with a common discharge duct 21 from which the gases may pass to the open air either directly or after treatment as by a scrubber. At a later stage of the operation air may be discharged from the cell through outlets 20 and duct 21. Obviously there may be a plurality of discharge ducts 21.

During the latter part of the treatment, the anaerobic fermentation is checked and drying and aerobic fermentation are produced by passing air through the cell. The air for this purpose may be admitted through one or more inlet ducts 22 connected with the lower parts of the spaces or compartments above the trays 16 through inlets 23. In order to prevent material under treatment from working into the outlets 20 or inlets 23, use may be made of racks or gratings 24 as indicated in Fig. 3.

In charging the cell, the trays or racks are arranged at the lowermost level and material is dumped thereon, through the openings 14 in the roof or top of the cell, until the material on the tray rises substantially above the inlet or inlets 23 for the corresponding compartment of the cell, for example up to the level for the next tray or set of trays. After each compartment is charged, the next higher set of trays is arranged in position and loaded and this operation is kept up until the cell is completely charged. Then, after the doors 19 are closed and the covers 15 put in place in the openings 14, anaerobic fermentation will start, due to the closing of the inlets 23 by the material to be treated. As the anaerobic fermentation proceeds with accompanying rise in temperature, and the material drains, the material in each compartment shrinks until the corresponding inlet or inlets, is exposed and air passes therethrough into the cell. The air passing through the cell tends to check the anaerobic fermentation, dry the material and set up aerobic fermentation. When the treatment is substantially completed, the door 19 may be opened and the trays unloaded.

With the arrangement in Fig. 1, air is admitted to the interior of the cell as soon as the upper surface of material in a compartment sinks below the top of an inlet 23 and as the exposed portion of an inlet 23 increases the flow of air will tend to increase. By making each inlet narrow vertically and long horizontally, the change from no flow of air to full flow would be made very rapidly.

An arrangement whereby a sudden opening of an inlet would occur is shown in Fig. 4. In this form, the inner end of an inlet passage 25 may be just below the level of the next higher rack 16, and into the inner end of the passage may be inserted one end of an elbow 26 of which the other end extends downwardly to a level to be reached before air is admitted. With this arrangement there is a sharp change from no air flow to substantially full flow.

It will be seen that after the cell is filled the operation is carried on substantially automatically.

It should be understood that various changes may be made and certain features used without others, without departing from the true scope and spirit of the invention.

Having thus described my invention, I claim:

1. In a fermentation cell for converting organic matter to humus, a plurality of sets of openwork trays dividing the cell into superimposed compartments, air outlets near the tops of said compartments, and air inlets near the bottoms of said compartments whereby charging of said compartments closes said openings to effect anaerobic action until the material shinks and opens said inlets for the passage of air through the cell.

2. In a fermentation cell for converting organic matter to humus, a plurality of sets of openwork trays dividing the cell into superimposed compartments, air outlets near the tops of said compartments, an air supply duct, and air inlets receiving air from said duct and communicating with the lower part of said compartments whereby charging of said compartments closes said openings to effect anaerobic action until the material shrinks and opens said inlets for the passage of air through the cell.

3. In a fermentation cell for converting organic matter to humus, a plurality of sets of openwork trays dividing the cell into super imposed compartments, air outlets near the top of said compartments, and downwardly-facing-air inlets near the bottoms of said compartments whereby charging of said compartments closes said openings to effect anaerobic action until the material shrinks and opens said inlets for the passage of air through the cell.

4. In a fermentation cell for converting organic matter to humus, a plurality of sets of openwork trays dividing the cell into superimposed compartments, air outlets near the top of said compartments, air inlet passages extending to the inner surface of the peripheral wall of the cell, and elbow ducts projecting at one end into said air inlet passages and at the other end extending downwardly to the lower parts of said compartments, whereby charging of said compartments closes said openings to effect anaerobic action until the material shrinks and opens said inlets for the passage of air through the cell.

5. In a fermentation cell for converting organic matter to humus, a plurality of sets of openwork trays dividing the cell into superimposed compartments, air outlets for said compartments, and air inlet means for supplying air at the lower part of each of said compartments, said air inlet means being rendered ineffective by the presence of material above a predetermined level and effective by the settling of said material below the said predetermined level, whereby charging of said compartments closes said openings to effect anaerobic action until the material shrinks and opens said inlets for the passage of air through the cell.

JULES R. BREUCHAUD.